US009575772B2

(12) United States Patent
Volkmer

(10) Patent No.: US 9,575,772 B2
(45) Date of Patent: Feb. 21, 2017

(54) MODEL-BASED USER INTERFACE

(71) Applicant: Michael Volkmer, Heidelberg (DE)

(72) Inventor: Michael Volkmer, Heidelberg (DE)

(73) Assignee: SAP SE, Walldorf (DE)

( * ) Notice: Subject to any disclaimer, the term of this patent is extended or adjusted under 35 U.S.C. 154(b) by 409 days.

(21) Appl. No.: 13/721,514

(22) Filed: Dec. 20, 2012

(65) Prior Publication Data

US 2014/0181701 A1    Jun. 26, 2014

(51) Int. Cl.
*G06F 9/44* (2006.01)
*G06Q 10/06* (2012.01)
*G06F 3/0481* (2013.01)

(52) U.S. Cl.
CPC ............ *G06F 9/4443* (2013.01); *G06Q 10/06* (2013.01); *G06F 3/0481* (2013.01)

(58) Field of Classification Search
CPC .............................. G06F 9/4443; G06F 3/0481
USPC ........................................................ 715/762
See application file for complete search history.

(56) References Cited

U.S. PATENT DOCUMENTS

| | | | | |
|---|---|---|---|---|
| 5,915,115 A * | 6/1999 | Talati | ........................ | G06F 8/10 714/E11.211 |
| 6,052,515 A * | 4/2000 | Bruckhaus | .......... | G06F 11/3664 714/E11.209 |
| 2004/0078373 A1 * | 4/2004 | Ghoneimy et al. | ............. | 707/10 |
| 2005/0065943 A1 * | 3/2005 | Miyata | .................... | G06F 21/64 |
| 2007/0211056 A1 * | 9/2007 | Chakraborty | .......... | G06T 11/206 345/440 |
| 2009/0150859 A1 * | 6/2009 | Cummings | ........... | G06F 9/4443 717/104 |
| 2010/0302274 A1 * | 12/2010 | Lee et al. | ....................... | 345/619 |
| 2013/0047107 A1 * | 2/2013 | O'Meara et al. | ............. | 715/769 |
| 2013/0117064 A1 * | 5/2013 | Sadeghi | ............ | G06Q 10/0633 705/7.27 |

\* cited by examiner

*Primary Examiner* — Ajay Bhatia
*Assistant Examiner* — Mong-Shune Chung
(74) *Attorney, Agent, or Firm* — Schwegman Lundberg & Woessner, P.A.

(57) ABSTRACT

Example systems and methods of configuring and displaying a model-based user interface are described. In one implementation, a method receives a request to configure a process model, the process model having an object type. A configuration rule associated with the object type is accessed, and a configuration instruction is received. The configuration instruction is analyzed based on the configuration rule, and if the configuration instruction is valid then the object type is modified based on the instruction. The process model is updated based on the modified object type. In another implementation, a method receives a request to display instance data of a process model, where the process model has an object type associated with the instance data. A structure rule determining placement of the instance data is accessed, and a user interface to display the instance data is generated based on the structure rule.

27 Claims, 7 Drawing Sheets

MODEL-BASED USER INTERFACE

FIELD

The present disclosure relates generally to the management of data and, more specifically, to managing the display of content.

BACKGROUND

Various business solutions are available to aid a user in managing their businesses. These solutions are usually implemented in software. Some such business solutions use various models to manage and organize business processes and information associated with the processes. Software is usually implemented to display the models in a user interface. Every business has different needs and different processes. In this situation, it is desirable to have a modifiable model that can be displayed easily.

BRIEF DESCRIPTION OF THE DRAWINGS

The present disclosure is illustrated by way of example, and not as limitation, in the accompanying drawings.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide systems and methods for managing and displaying a model based user interface. These embodiments discuss, by way of example, modifying a process model and displaying instance data associated with the process model in a user interface.

A process model is a model to manage processes. The processes may be processes that are supported by solutions provided by SAP AG of Walldorf, Germany. The processes are designed based on business requirements and are implemented in software, and consist of process data also referred to as process instance data. The process model manages the object types associated with the objects within an instance of a model. The process model is a model based directory that allows changes to the model by users. A user interface is provided that displays an instance associated with the process model. The instance of the process model consists of objects. The process model consists of object types corresponding to the objects of the instance. A process model organizes the object types in a process hierarchy. The process model consists of attribute types associated with the object types, and content (such as documents and development objects) associated with the object types. Some embodiments describe a mechanism that allows users to make changes to the process model based on configuration rules that maintain a certain structure for the modified process model so that the instance associated with the process model is displayable in a generic user interface. Other embodiments describe a mechanism to display the instance associated with the process model in a generic user interface based on structure rules associated with the objects of the instance. The user can modify the process hierarchy, the object types, the attributes, and the content. The configuration rules ensure that the changes that the user makes to the process model are displayable in a generic user interface. The user interface determines placement of the objects within the user interface based on the structure rules associated with the object, the structure rules determining the object type corresponding to the object.

Figure 1:
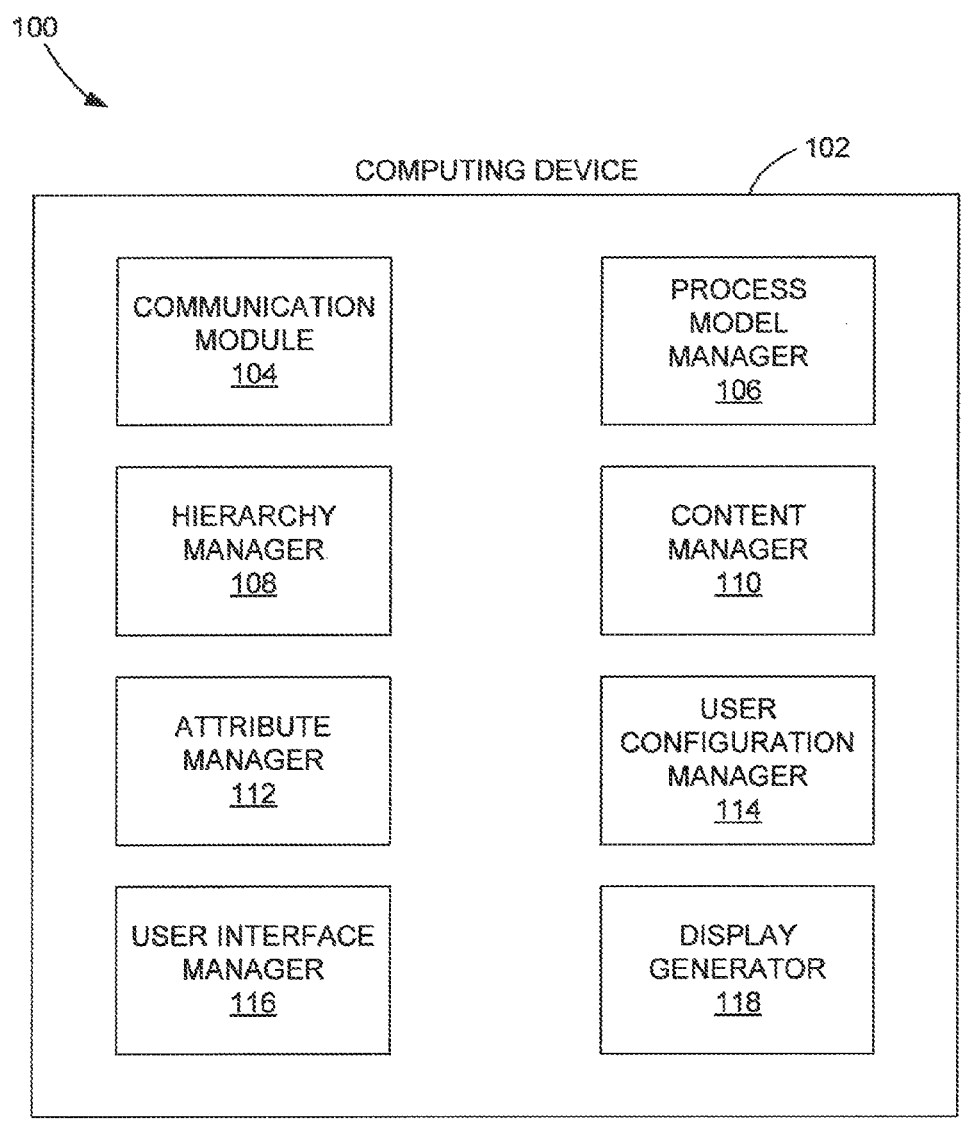
FIG. 1 is a block diagram of an example system capable of employing the systems and methods described herein, according to some embodiments.

FIG. 1 is a block diagram of an example system 100 capable of employing the systems and methods described herein, according to some embodiments. In the example of FIG. 1, a computing device 102 comprises a communication module 104, a process model manager 106, a hierarchy manager 108, a content manager 110, an attribute manager 112, a user configuration manager 114, a user interface manager 116, and a display generator 118. The computing device 102 may include a server, a client computer, a desktop computer, a laptop computer, a tablet computer, a mobile device, a portable entertainment device or any other machine capable of performing one or more of the functions and operations discussed herein. The computing device 102 includes machines and software to implement the described user interface management systems and methods.

In some embodiments, the computing device 102 may communicate with a server via a data communication network, such as the Internet, a local area network (LAN), wide area network (WAN), and so forth. In particular implementations, the computing device 102 may be accessed or operated by a variety of users, such as an application developer, a network administrator or an end-user of an application. In other implementations, one or more functions performed by the computing device 102 may be handled automatically and without user intervention.

The computing device 102 includes a communication module 104 capable of communicating with a variety of different systems through a data communication network or other communication mechanism. For example, the communication module 104 may communicate with a server, other computing platforms, content sources, data storage devices, and the like. A process model manager 106 performs various functions related to accessing and organizing multiple process models. For example, the user may have saved multiple process models depending on his needs. The process model manager 106 accesses and presents the appropriate process model based on input from the user. Various object types are organized in a hierarchy within the process model. A hierarchy manager 108 manages the process hierarchy of a process model. A content manager 110 manages the content of the process model. Content may include documents and development objects associated with the object types. An attribute manager 112 manages the attributes and characteristics associated with the object types.

A user configuration manager 114 performs various functions related to managing and configuring process models and object types based on user input. For example, a user can modify the process model by modifying the process hierarchy, and the content and the attributes associated with the object types. The user configuration manager 114 accesses configuration rules associated with the process model, and allows the user to modify the process model based on these configuration rules. The user configuration manager 114 updates the process model based on the modifications, and saves the updated process model.

A user interface manager 116 performs various functions related to accessing, organizing, and presenting instance data associated with the process models. For example, the user interface manager 116 prepares the user interface for display by accessing structure rules associated with object types and determining placement of various instance data within the user interface based on the structure rules. A display generator 118 generates appropriate display information to support the display of a user interface prepared by the user interface manager 116.

Figure 2:
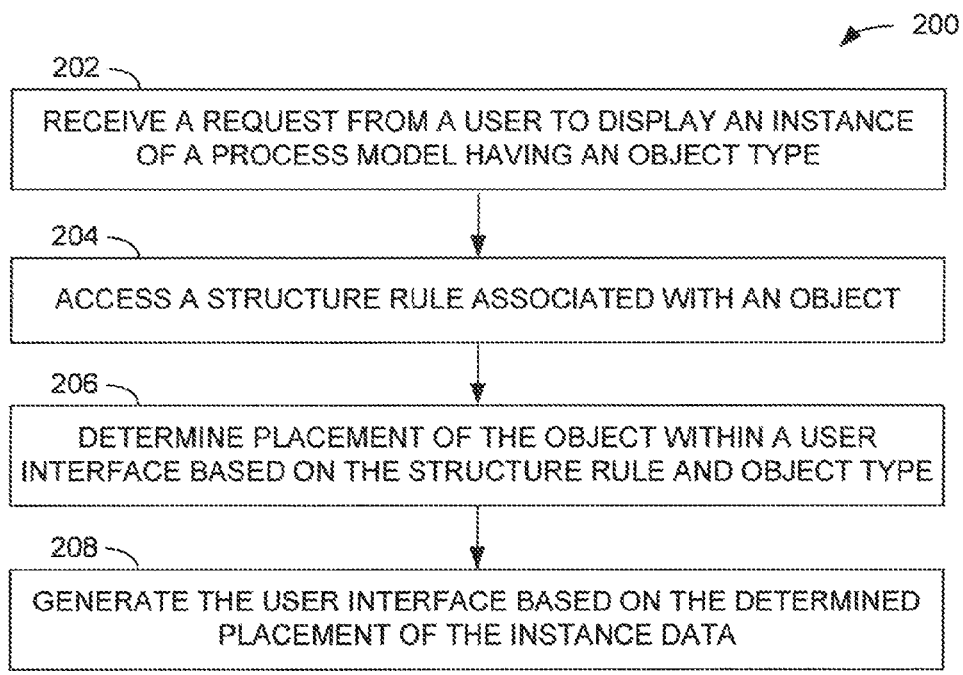
FIG. 2 is a flow diagram of an example method of displaying an instance of a process model in a user interface, according to some embodiments.
Figure 4:
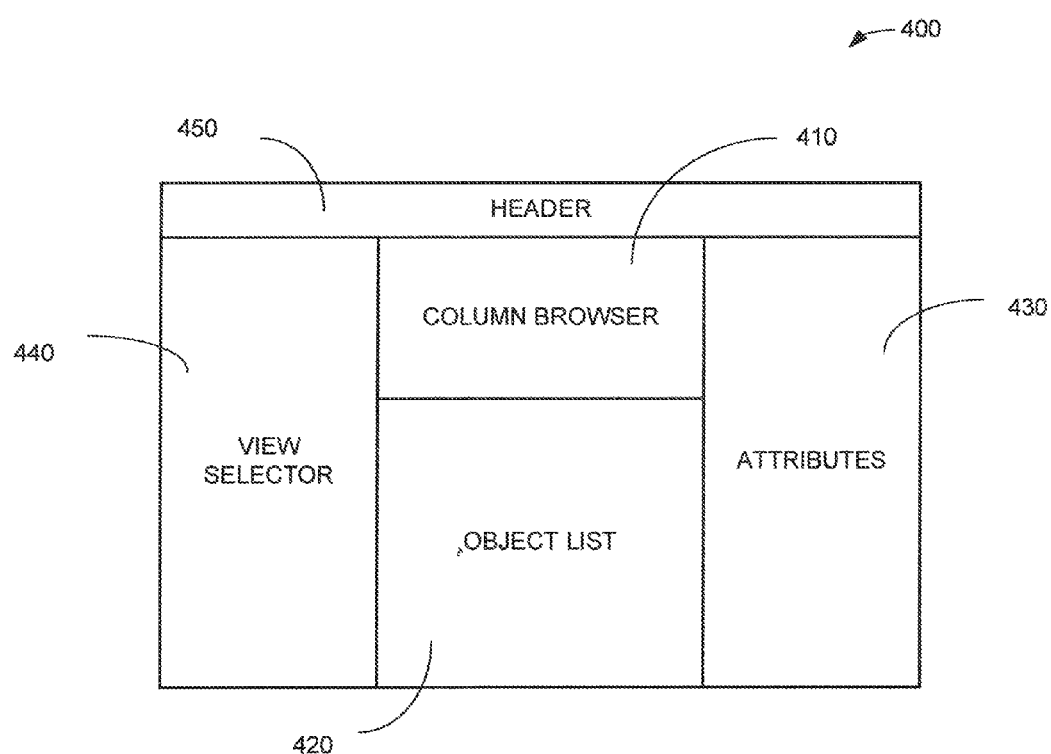
FIG. 4 illustrates an example user interface displaying process model content according to some embodiments.

FIG. 2 is a flow diagram of an example method of displaying an instance of a process model in a user interface according to some embodiments. FIG. 4 illustrates an example user interface displaying process model content according to some embodiments. FIGS. 2 and 4 are described below in conjunction with each other to describe one or more embodiments of the model-based user interface.

FIG. 2 is a flow diagram of an example method 200 of displaying an instance of a process model in a user interface according to some embodiments. Initially, the method 200 receives a request, from a user, to display an instance of a process model, the process model having at least one object type and the instance having at least one object at a block 202. The process model may consist of at least one object type organized in a process hierarchy. The object type has attributes and content associated with it. The process model may have multiple object types. The instance associated with the process model can have a plurality of objects. For each object of the instance, the object type of the object can be derived. The user interface displays the instance based on the object type associated with the objects.

The method 200 continues by accessing a structure rule associated with the at least one object at a block 204. The structure rule determines the object type associated with the object. The structure rule associated with the object may be defined by a set of flags associated with the object. The set of flags may determine the object type of the object. For example, the flags may define two non-overlapping parts within the process model. The two non-overlapping parts may be called 'a structure hierarchy' and 'a list group hierarchy.' It is understood that these two non-overlapping parts may be referred to by other names. The objects of the instance associated with the non-overlapping parts of the process model are displayed in different pans of the user interface.

At a block 206, the method 200 determines placement of the object within a user interface based on the structure rule and the object type. The object type of the object is determined by accessing the structure rule associated with the object. For example, an object can have a corresponding structure rule that indicates that it is a structure hierarchy object type. The object associated with this object type may be displayed in a particular part of the user interface. In another example, the process item may have a corresponding structure rule that indicates that it is a list group hierarchy object type. The object associated with this type of object type may be displayed in another part of the user interface. In some embodiments, the particular pan of the user interface where the objects of structure hierarchy object type and objects of list group hierarchy object type are displayed are pre-determined. For example, FIG. 4 illustrates a user interface 400 having a column browser area 410 and an object list area 420. The objects associated with a structure hierarchy object type are displayed in the column browser area 410. The objects associated with a list group hierarchy object type are displayed in the object list area 420. Each of these objects has attributes associated with them. An attributes area 430 displays these associated attributes. A user can select an object from the column browser. The view selector area 440 allows the user to search and query the instance. The header 450 provides data and functions relevant to the instance displayed in the user interface. In some embodiments, the data and functions in header 450 can include a name of the instance, a language, and the like. Even though the column browser 410, the object list area 420, the attributes area 430, the view selector area 440, and the header 450 are shown at a particular location in the user interface 400, it is understood that these areas can be displayed anywhere in the user interface 400.

The method 200 then generates the user interface based on the determined placement of the objects at a block 208. The user interface is a generic user interface, and it is the same for all process models. The structure rules ensure that an instance associated with different process models can be displayed in the same generic user interface. As such, the user can modify the process model, and the instance of the modified process model can be displayed in the generic user interface. This is done by determining placement of the objects of the instance based on the structure rules associated with the object. The structure rule determines the object type of the object, and the placement of the object is based on the object type. The user interface is generated based on the placements determined at block 206.

Figure 3:
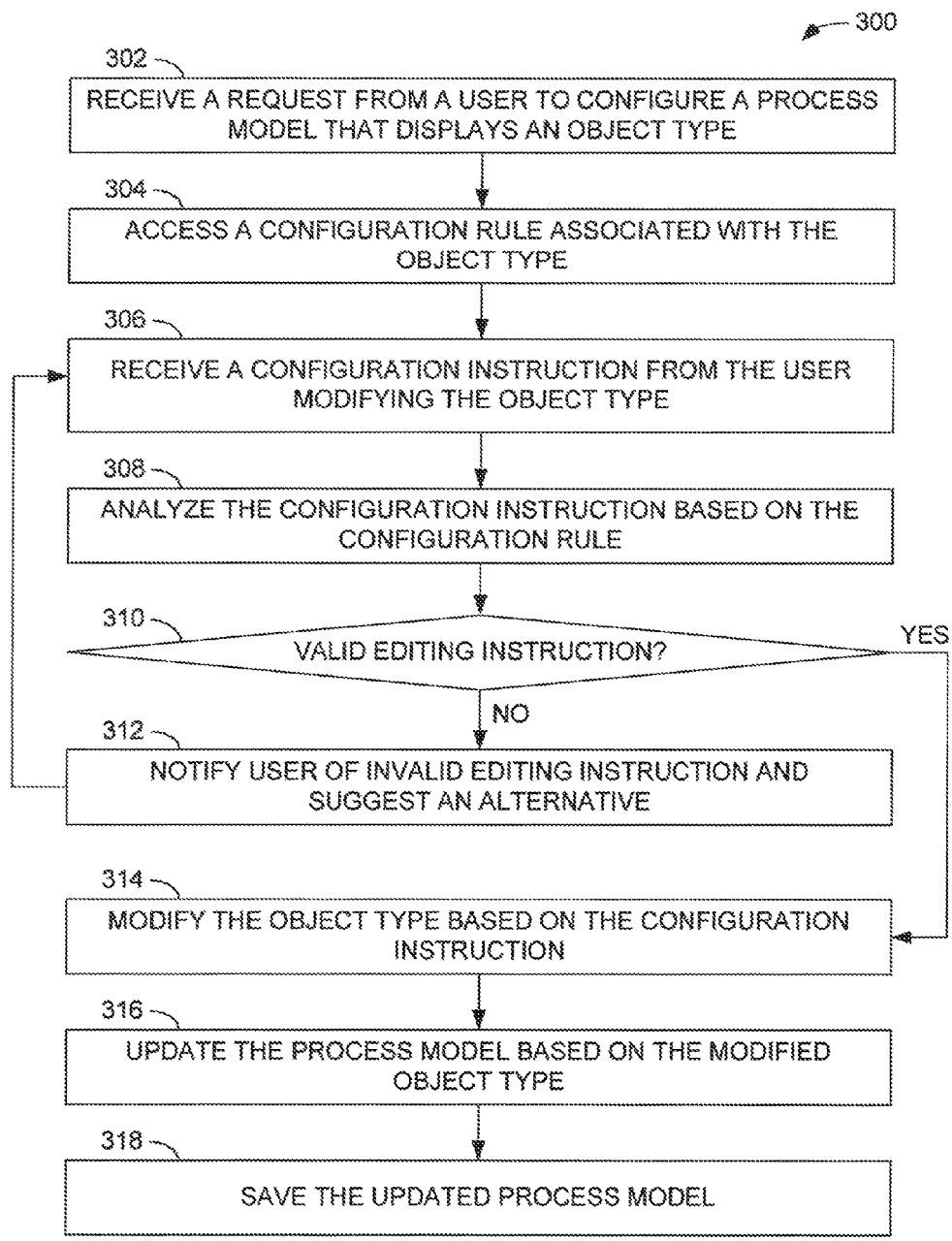
FIG. 3 is a flow diagram of an example method of configuring a process model according to some embodiments.

FIG. 3 is a flow diagram of an example method 300 of configuring process model according to some embodiments. The method 300 receives a request, from a user, to configure a process model that displays an object type at a block 302. The process model may display multiple object types. The process model includes a process hierarchy by which the object types are organized. The process model includes attributes and content associated with the object type. The user can configure and modify the process hierarchy, the attributes and the content.

At a block 304, the method 300 accesses as configuration rule associated with the object type. The user can change the process model as the configuration rule allows. The configuration rule ensures that the change made by the user can be displayed in a generic user interface. In an example embodiment, an object type may have a set of flags associated with it. The configuration rule uses these flags to determine the possible changes that the user can make.

For example, each object type may have a "is Structure" flag and a "is Group" flag. The status of the flags determines the type of the object type. For example, a normal object type is defined by "is Structure"=false and "is Group"=false. A structure object type is defined by "is Structure"=true and "is Group"=false. A structure group object type is defined by "is Structure"=true and "is Group"=true. A list group object type is defined by "is Structure"=false and "is Group"=true. Using these object types, the following configuration rules may be implemented. Only structure group object types and list group object types are allowed at a top level of the process hierarchy of the process model. Below a structure group object type only structure object types are allowed. Below a structure object type only a structure group object type and a list group object type are allowed. Below a list group object type only normal object types are allowed. Below a normal object type only a list group object type is allowed. These example configuration rules ascertain that the structure and structure group part of the model is to a certain extend separated from the list and list group part. In other embodiments, the configuration rules may be implemented differently than described herein.

The method 300 receives a configuration instruction from the user modifying the object type at a block 306. The user can modify the object type of the process model. The user can also modify the process hierarchy, the attributes and the content. The configuration instruction relates to modifying at least one object type. In an example embodiment, the configuration instruction can be an instruction to add or hide an object type. The configuration instruction can also be an instruction to add or hide a relationship between two object types and between an object type and an attribute. The configuration instruction can also add or hide a relationship between an attribute and an attribute group. In some embodiments, the configuration instruction can add or hide a hierarchy.

At a block 308, the method 300 analyzes the configuration instruction based on the configuration rule. The configuration instruction is analyzed in light of the configuration rule accessed at block 306. The configuration instruction is analyzed to check that the instruction does not violate the configuration rule associated with the object type, and that the change made by the user can be displayed in the generic user interface.

At a block 310, the method 300 determines whether the configuration instruction is valid based on the configuration rule. If the configuration instruction is not valid then the method 300 moves on to a block 312. At block 312, the method 300 notifies the user of that the configuration instruction is invalid and suggests an alternative, in some embodiments, an alternative is not suggested at block 312. After block 312, the method 300 continues to block 306 where it receives another configuration instruction from the user.

If the configuration instruction is valid, then the method 300 moves on to a block 314. At block 314, the method 300 modifies the object type based on the configuration instruction. The method 300 updates the process model based on the modified object type at a block 316.

The method 300 saves the updated process model at a block 318. The updated process model may be saved as being associated with the user. The updated process model may be saved as being associated with an extension. A user can use different extensions and save different process model for different tasks. For example, a user can configure a process model for an accounting task, and save the process model with an extension that indicates that the process model is for accounting. The user can then configure the process model for an inventory task, and save the process model with an extension that indicates that the process model is for inventory. In this way, the user can have multiple process models on the same system. The saved process model may be retrieved when the user accesses the process model again.

FIG. 4 illustrates an example user interface 400 displaying process model content according to some embodiments. User interface 400 includes a column browser area 410, an object list area 420, attributes area 430, a view selector area 440, and a header 450. In some embodiments, the objects of the instance associated with a process model may be displayed in user interface 400. As discussed above, the objects associated with a certain object type may be displayed in the column browser area 410, while the objects associated with a different object type may be displayed in the object list area 420. Attributes associated with a select object group may be displayed in the attributes area 430. A user can select an object from the column browser. The view selector area 440 allows the user to search and query the instance. The header 450 provides data and functions relevant to the instance displayed in the user interface. In some embodiments, the data and functions in header 450 can include a name of the instance, a language, and the like.

Figure 5:
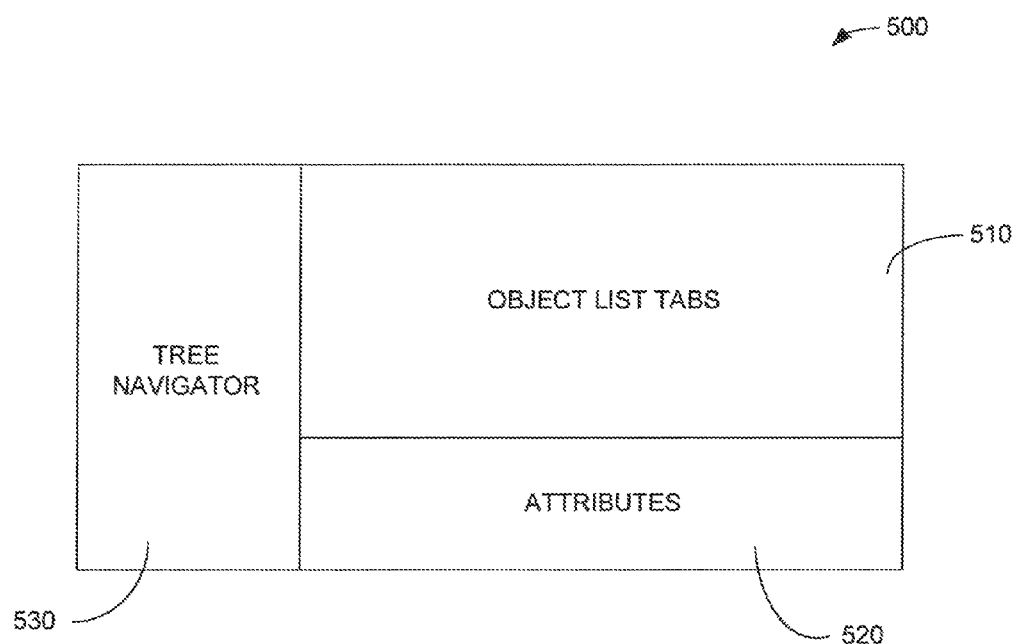
FIG. 5 illustrates an example user interface displaying process model content according to some embodiments.

FIG. 5 illustrates an example user interface 500 displaying process model content according to some embodiments. User interface 500 includes an object list tabs area 510, an attributes area 520, and a tree navigator area 530. In some embodiments, the objects of the instance associated with a process model may be displayed in user interface 500. For example, objects associated with a list group object type and a normal object type may be displayed in the object list tabs area 510. Attributes for a selected object type may be displayed in the attributes area 520. Objects for a structure object type may be displayed in the tree navigator area 530.

Figure 6:
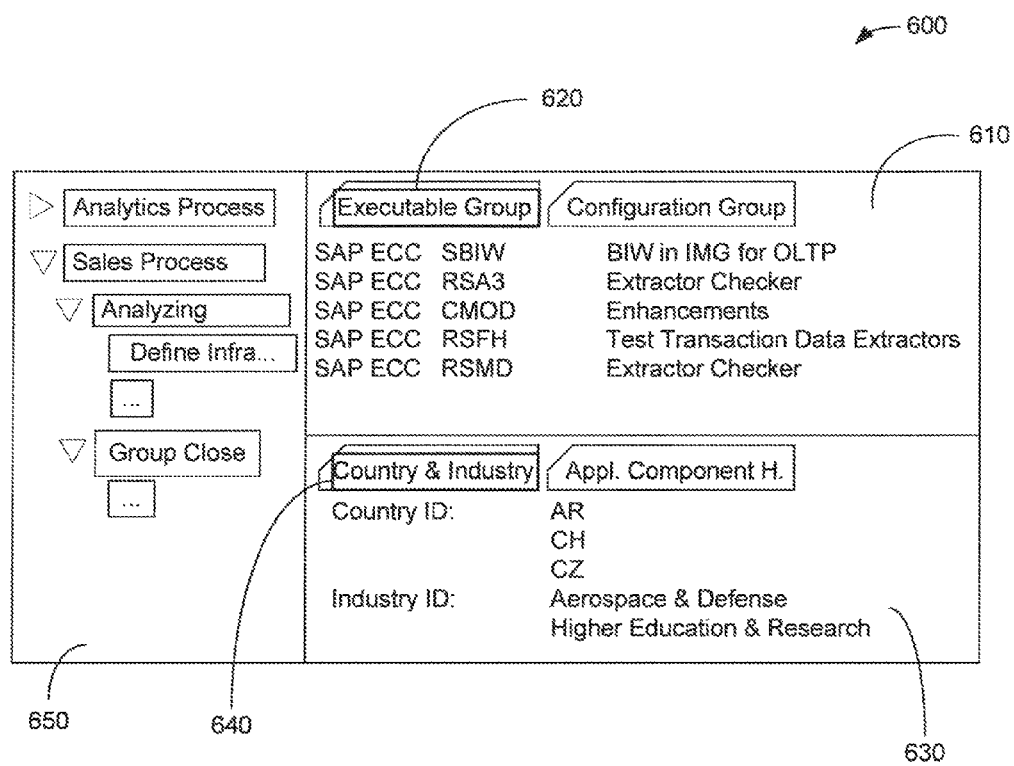
FIG. 6 illustrates an example user interface displaying process model content according to some embodiments.

FIG. 6 illustrates an example user interface 600 displaying process model content according to some embodiments. User interface 600 displays objects of an instance associated with a process model. Area 610 displays list group objects and normal object types organized by tabs. Tab 620 labeled as Executable Group is selected as an example. The objects associated with that tab are displayed in area 610. Area 630 displays attributes organized by tabs. Tab 640, labeled as Country & Industry, is selected for example, and the associated attributes is displayed in area 630. Area 650 displays instance data associated with structure object types.

In an example embodiment, the attributes of selected objects in the user interface is handled in a two layer approach. The attributes have corresponding attributes types, similar to objects having a corresponding object type. The attribute types are grouped independently from the process model. An attribute type can be assigned to only one attribute group. The attribute types may be ordered within each attribute group. The attribute groups and ordering can be used to display attributes in the user interface. The ordering makes clear the placement of the attribute associated with the attribute type within the attribute group. The user can select an object in the user interlace, and the corresponding attribute groups are displayed in the user interface. Some attributes of an attribute group may not apply to the selected object since they were not assigned to the object type of the object. In this case, those attributes are not displayed in the group, and no empty space is created in the user interface. Assigning attributes to an object type can be done by the user while modifying the process model. The user can add or hide attribute types associated with an object type.

User interface 400 of FIG. 4 can display attributes in the attribute area. The object of an instance can be selected in the column browser area 410 or the object list area 420. The object type of the selected object is determined as discussed herein. Based on the object typo, the attribute types and the attribute groups can be determined. Each attribute group is displayed in the user interface. Within each attribute group, the corresponding attributes are displayed.

In an example embodiment, the user may select an object associated with several object list groups in the column browser, and the user interface displays the associated object list groups in a column in the object list area. Each object list group object type (associated with an object list group) is associated with one or more object types. The corresponding objects are displayed as rows in the object list area. The other columns in the object list area represent attributes of the objects. The objects may have a large number of attributes assigned to it in the process model. However, only a subset of the attributes may be displayed in the object list area as columns. In some embodiments, the user can configure which attributes are displayed as columns in the object list area. The user interface may include a button labeled "display settings." The user can select which object list group object types are displayed in the object list area. The user can select to display all of the object list groups or any subset of the object list groups. If the user selects one object list group to display, then the user may configure which attributes of the corresponding object types is displayed in the object list area. If the user selects to display more than one object list group, then the user may configure a different set of attributes to be displayed in the object list group. For example, in user interface 400 of FIG. 4 the object list area 420 may display object list groups and corresponding attributes in columns as configured by the user. In user interface 600 of FIG. 6, the object list groups may be displayed in area 650. The objects corresponding to a selected object list group or object list groups may be displayed as tabs, such as tab 620. The attributes corresponding to the object represented by tab 620 may be displayed in area 610 in columns when tab 620 is selected.

Figure 7:
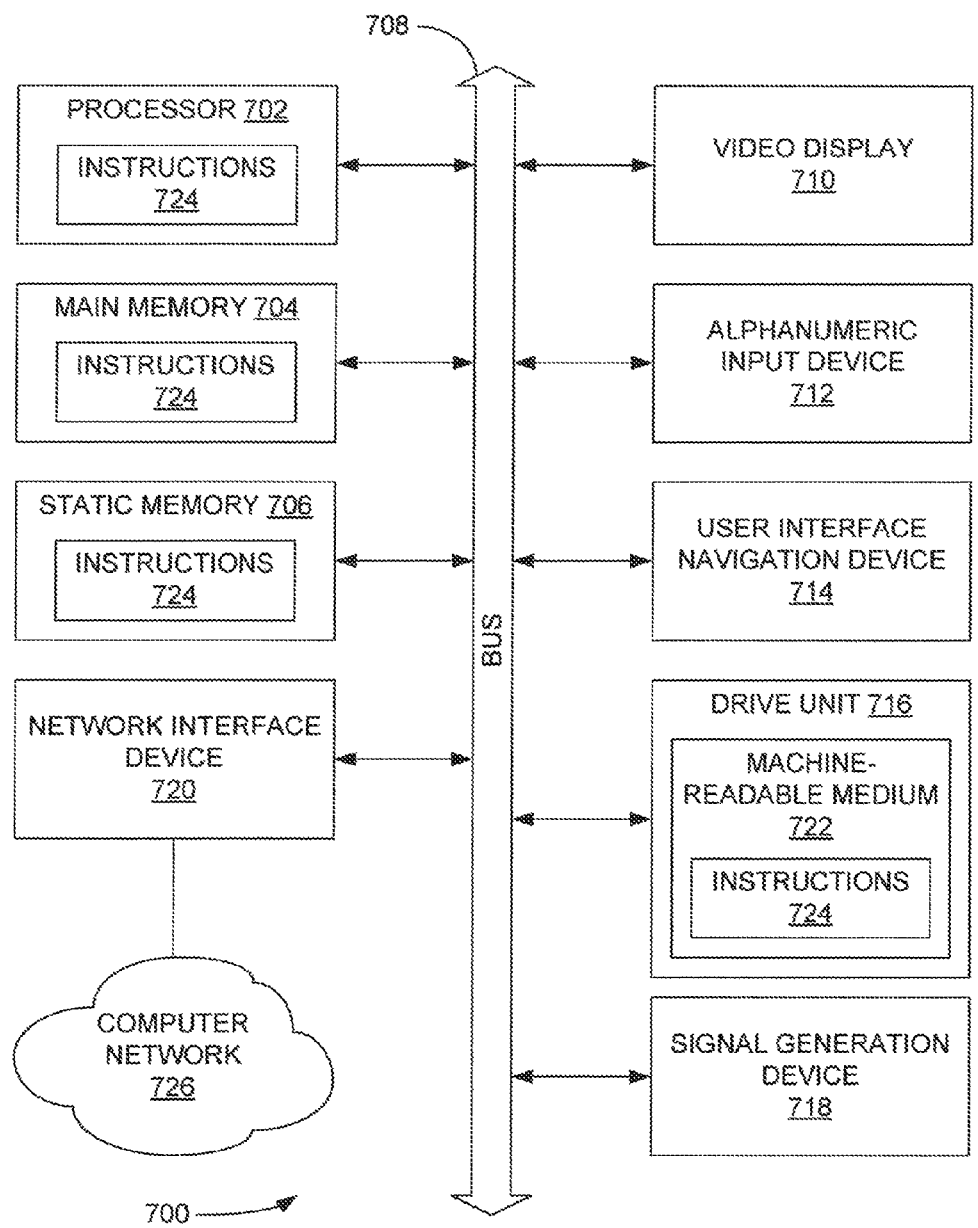
FIG. 7 depicts a block diagram of a machine in the example form of a processing system within which may be executed a set of instructions for causing the machine to perform any one or more of the methodologies discussed herein.

FIG. 7 depicts a block diagram of a machine in the example form of a processing system 700 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (for example, a central processing unit (CPU), a graphics processing unit (GPU), or both), a main memory 704 (for example, random access memory), and static memory 706 (for example, static random-access memory), which communicate with each other via bus 708. The processing system 700 may further include video display unit 710 (for example, a plasma display, a liquid crystal display (LCD), or a cathode ray tube (CRT)). The processing system 700 also includes an alphanumeric input device 712 (for example, a keyboard), a user interface (UI) navigation device 714 (for example, a mouse), a disk drive unit 716, a signal generation device 718 (for example, a speaker), and a network interface device 720.

The disk drive unit 716 (a type of non-volatile memory storage) includes a machine-readable medium 722 on which is stored one or more sets of data structures and instructions 724 (for example, software) embodying or utilized by any one or more of the methodologies or functions described herein. The data structures and instructions 724 may also reside, completely or at least partially, within the main memory 704, the static memory 706, and/or within the processor 702 during execution thereof by processing system 700, with the main memory 704 and processor 702 also constituting machine-readable, tangible media.

The data structures and instructions 724 may further be transmitted or received over a computer network 726 via network interface device 720 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 700) or one or more hardware modules of a computer system (for example, a processor 702 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 702 that is configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 702 that are temporarily configured (for example, by software) or permanently configured to perform the relevant operations. Whether temporarily or permanently configured, such processors 702 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine but deployed across a number of machines. In some example embodiments, the processors 702 may be located in a single location (for example, within a home environment, within, an office environment, or as a server farm), while in other embodiments, the processors 702 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A computer-implemented method comprising:
receiving a request from a user to configure a process model representing a model based directory, the process model including a process hierarchy for organizing a plurality of objects, wherein each of the plurality of objects is associated with at least one of a plurality of object types, wherein a first object of the plurality of objects is associated with a first object type of the plurality of object types, wherein the first object type is associated with a first group flag and a first structure flag and wherein a combination of the first group flag and the first structure flag defines the object type for the first object;
accessing a set of configuration rules for the process model, the set of configuration rules defining hierarchical relationships related to the plurality of objects in the process hierarchy based on object type, wherein the set of configuration rules indicates that objects associated with the first object type are permitted at a top level of the process hierarchy and that objects associated with a second object type are permitted at a second level of the process hierarchy;
receiving a configuration instruction from the user, the configuration instruction related to modifying the plurality of object types;
analyzing the configuration instruction based on the set of configuration rules;
determining, using one or more processors, whether the configuration instruction is valid based on the set of configuration rules;
responsive to the determining that the configuration instruction is valid:
modifying the plurality of object types based at least in part on the configuration instruction to generate a modified plurality of object types; and
updating the process model based on the modified plurality of object types to generate an updated process model.

2. The computer-implemented method of claim 1, wherein the set of configuration rules maintains a process model structure to be displayed in a generic user interface.

3. The computer-implemented method of claim 2, wherein the generic user interface presents instance data based on the process model.

4. The computer-implemented method of claim 1, wherein the process hierarchy includes associated attributes and content.

5. The computer-implemented method of claim 4, wherein the content includes at least one of a document, and a development object.

6. The computer-implemented method of claim 5, wherein the content represents a content list representing at least one of a list of executables or a list of documents.

7. The computer-implemented method of claim 1, wherein the determining that the configuration instruction is valid comprises determining that a modified object type is displayable in a generic user interface.

8. The computer-implemented method of claim 1, further comprising notifying the user of an invalid configuration instruction in response to the determining that the configuration instruction is invalid.

9. The computer-implemented method of claim 1, further comprising displaying the updated process model.

10. The computer-implemented method of claim 1, further comprising saving the updated process model as being associated with the user.

11. The computer-implemented method of claim 10, further comprising retrieving the saved process model in response to receiving a request from the user to access the process model.

12. The computer-implemented method of claim 1, further comprising saving the updated process model as being associated with an extension.

13. The computer-implemented method of claim 1, wherein the plurality of object types comprises a normal object type, a structure object type, a structure group object type, and a list group object type.

14. The computer-implemented method of claim 1, wherein the configuration instruction is an instruction to add a new object type to the plurality of object types.

15. The computer-implemented method of claim 1, wherein the first object type is associated with multiple attributes
such that each instance of the first object type is associated with the multiple attributes.

16. The computer-implemented method of claim 15, wherein the configuration instruction is an instruction add a relationship between an attribute from the multiple attributes and an attribute group.

17. The computer-implemented method of claim 15, wherein the configuration instruction is an instruction to hide a relationship between an object type of the plurality of object types and an attribute from the multiple attributes.

18. The computer-implemented method of claim 15, wherein the configuration instruction is an instruction to add a relationship between an object type of the plurality of object types and an attribute from the multiple attributes.

19. The computer-implemented method of claim 15, wherein the configuration instruction is an instruction to hide a relationship between an attribute from the multiple attributes and an attribute group.

20. The computer-implemented method of claim 1, wherein the configuration instruction is an instruction to add a relationship between two object types of the plurality of object types.

21. The computer-implemented method of claim 1, wherein modifying the plurality of object types comprises modifying at least one of the plurality of object types.

22. The computer-implemented method of claim 1, wherein modifying the plurality of object types comprises hiding an object type from the plurality of object types.

23. The computer-implemented method of claim 1, wherein the configuration instruction is an instruction to hide a relationship between two object types of the plurality of object types.

24. An apparatus comprising:
an interface configured to communicate with a user of the apparatus;
a memory configured to store data; and
one or more processors coupled to the interface and the memory, the one or more processors configured to perform operations comprising:
receiving a request from a user to configure a process model representing model based directory, the process model including a process hierarchy for organizing a plurality of objects, wherein each of the plurality of objects is associated with at least one of a plurality of object types, wherein a first object of the plurality of objects is associated with a first object type of the plurality of object types, wherein the first object type is associated with a first group flag and a first structure flag, and wherein a combination of the first group flag and the first structure flag defines the object type for the first object;
accessing a set of configuration rules for the process model, the set of configuration rules defining hierarchical relationships related to the plurality of objects in the process hierarchy based on object type, wherein the set of configuration rules indicates that objects associated with the first object type are permitted at a top level of the process hierarchy and that objects associated with a second object type are permitted at a second level of the process hierarchy;
receiving a configuration instruction from the user, the configuration instruction related to modifying the plurality of object types;
analyzing the configuration instruction based on the set of configuration rules;
determining whether the configuration instruction is valid based on the set of configuration rules;
in response to the determination that the configuration instruction is valid:
modifying the plurality of object types based at least in part on the configuration instruction to generate a modified plurality of object types; and
updating the process model based on the modified plurality of object types to generate an updated process model.

25. The apparatus of claim 24, wherein the one or more processors is further configured to perform operations comprising:
receiving a request from the user to display an instance associated with the updated process model, the instance having a second object of the plurality of objects;
accessing a structure rule associated with the second object, wherein the structure rule determines a modified object type associated with the second object;
determining the modified object type associated with the object;
determining placement of the object within a user interface based on the modified object type; and
generating the user interface to display the instance associated with the updated process model based on the determined placement of the second object.

26. The apparatus of claim 25, wherein the structure rule is based on at least one flag.

27. The apparatus of claim 24, wherein the set of configuration rules maintains a process model structure to be displayed in a generic user interface.

* * * * *